United States Patent
Lonsberry et al.

(10) Patent No.: US 11,407,110 B2
(45) Date of Patent: Aug. 9, 2022

(54) REAL TIME FEEDBACK AND DYNAMIC ADJUSTMENT FOR WELDING ROBOTS

(71) Applicant: Path Robotics, Inc., Columbus, OH (US)

(72) Inventors: Alexander James Lonsberry, Cleveland Heights, OH (US); Andrew Gordon Lonsberry, Columbus, OH (US); Surag Balajepalli, Columbus, OH (US); Dylan Desantis, Columbus, OH (US)

(73) Assignee: Path Robotics, Inc., Columbus, OH (US)

( * ) Notice: Subject to any disclaimer, the term of this patent is extended or adjusted under 35 U.S.C. 154(b) by 0 days.

(21) Appl. No.: 17/379,741

(22) Filed: Jul. 19, 2021

(65) Prior Publication Data
US 2022/0016776 A1    Jan. 20, 2022

Related U.S. Application Data

(60) Provisional application No. 63/053,324, filed on Jul. 17, 2020.

(51) Int. Cl.
*B25J 9/16* (2006.01)
*G06T 7/70* (2017.01)
(Continued)

(52) U.S. Cl.
CPC .......... *B25J 9/1664* (2013.01); *B23K 9/0956* (2013.01); *B23K 9/1274* (2013.01);
(Continued)

(58) Field of Classification Search
CPC ......... B25J 9/1664; G01B 11/25; G05D 3/20; G06K 9/00671; G06K 9/6267; G06K 2209/19; G06T 7/70; G06T 2207/10028
See application file for complete search history.

(56) References Cited

U.S. PATENT DOCUMENTS 4,234,777 A * 11/1980 Balfanz ............... B23K 9/1274
219/124.32
5,624,588 A * 4/1997 Terawaki ............. B23K 9/1272
901/42
(Continued)

FOREIGN PATENT DOCUMENTS

CN    110524581 A    12/2019
CN    111189393 A    5/2020

OTHER PUBLICATIONS

Ahmed, S.M. (Oct. 2016) "Object Detection and Motion Planning for Automated Welding of Tubular Joints" 2016 IEEE/RSJ International Conference on Intelligent Robots and Systems, Daejeon, Korea, Oct. 9-14; pp. 2610-2615.

(Continued)

*Primary Examiner* — Aaron W Carter
(74) *Attorney, Agent, or Firm* — Conley Rose, P.C.

(57) ABSTRACT

Systems and methods for real time feedback and for updating welding instructions for a welding robot in real time is described herein. The data of a workspace that includes a part to be welded can be received via at least one sensor. This data can be transformed into a point cloud data representing a three-dimensional surface of the part. A desired state indicative of a desired position of at least a portion of the welding robot with respect to the part can be identified. An estimated state indicative of an estimated position of at least the portion of the welding robot with respect to the part can be compared to the desired state. The welding instructions can be updated based on the comparison.

21 Claims, 4 Drawing Sheets

(51) Int. Cl.
- *G06V 20/20* (2022.01)
- *B23K 9/095* (2006.01)
- *B23K 9/127* (2006.01)
- *B23K 26/03* (2006.01)
- *G01B 11/25* (2006.01)
- *G05D 3/20* (2006.01)
- *G06K 9/62* (2022.01)

(52) U.S. Cl.
CPC ............ *B23K 26/032* (2013.01); *G01B 11/25* (2013.01); *G05D 3/20* (2013.01); *G06T 7/70* (2017.01); *G06V 20/20* (2022.01); *G06K 9/6267* (2013.01); *G06T 2207/10028* (2013.01); *G06V 2201/06* (2022.01)

(56) References Cited

U.S. PATENT DOCUMENTS

| | | | | |
|---|---|---|---|---|
| 10,551,179 | B2* | 2/2020 | Lonsberry | G01B 11/2518 |
| 2010/0152870 | A1* | 6/2010 | Wanner | G01B 21/042 |
| | | | | 901/3 |
| 2013/0123801 | A1* | 5/2013 | Umasuthan | A61B 1/06 |
| | | | | 606/130 |
| 2014/0365009 | A1* | 12/2014 | Wettels | B25J 13/082 |
| | | | | 700/258 |
| 2016/0257000 | A1* | 9/2016 | Guerin | B25J 9/1671 |
| 2018/0065204 | A1* | 3/2018 | Burrows | B25J 11/007 |
| 2018/0304550 | A1* | 10/2018 | Atherton | G05B 19/4099 |
| 2018/0341730 | A1* | 11/2018 | Atherton | G06F 30/23 |
| 2020/0021780 | A1* | 1/2020 | Jeong | H04N 5/2253 |
| 2020/0114449 | A1* | 4/2020 | Chang | B23K 9/0956 |
| 2020/0164521 | A1* | 5/2020 | Li | G06T 7/30 |
| 2020/0269340 | A1* | 8/2020 | Tang | B25J 9/1697 |
| 2020/0316779 | A1* | 10/2020 | Truebenbach | B25J 9/1692 |
| 2022/0016776 | A1* | 1/2022 | Lonsberry | G06V 20/20 |

OTHER PUBLICATIONS

Xiao, R. et al. (Aug. 2019) "An adaptive feature extraction algorithm for multiple typical seam tracking based on vision sensor in robotic arc welding" Sensors and Actuators A: Physical, 297:111533, 15 pages.

International Application No. PCT/US2021/042218, filed Jul. 19, 2021, by Path Robotics, Inc.: International Search Report and Written Opinion, dated Dec. 9, 2021, including Notification of Transmittal; 16 pages.

* cited by examiner

REAL TIME FEEDBACK AND DYNAMIC ADJUSTMENT FOR WELDING ROBOTS

CROSS-REFERENCE TO RELATED APPLICATIONS

This application claims priority to U.S. Patent Application Ser. No. 63/053,324 filed Jul. 17, 2020, which is hereby incorporated in its entirety by this reference.

TECHNICAL FIELD

This disclosure relates generally to the field of robotic welding. More specifically, this disclosure relates to systems and methods for providing real time feedback and enabling dynamic adjustment for welding robots.

BACKGROUND

Welding robots automate the process of welding machine parts. Conventional robotic welding has several challenges. For example, existing methods require a programmer to provide specific instructions (e.g., a welding path) to welding robots to perform robotic welding. Alternatively, hand-held devices such as teach pendants can be used to provide specific instructions to welding robots. Known robotic welding systems, however, typically follow welding instructions inflexibly. Therefore, if any changes occur to the welding operation, a portion of the welding robot, the seam, or the part itself and/or if the instructions are not precise, the consequent welding operations can result in bad welds.

Some existing methodologies use models such as kinematic models or computer aided design (CAD) models to determine instructions for the welding robot. For instance, CAD models can identify an approximate location of a seam to be welded relative to the part. Kinematic models of the robotics system can be used in part to determine the motion plan of the robotic system to move the welding tip in order to deposit material in the desired location. However, these models are not always precise. For example, CAD models may not match the physical dimensions of the part. More specifically, the actual geometric shape or dimensions of the parts may vary slightly from the shape or dimensions of the parts in a CAD model. Such discrepancy can result in bad welds.

Therefore, there is an unmet need for new and improved systems and methods for providing real time feedback and dynamic adjustment for welding robots to improve the welds in real time and adjust the instructions in real time.

SUMMARY

In some embodiments, a computer-implemented method for updating welding instructions for a welding robot is described herein. The computer-implemented method can include receiving data of a workspace that includes a part to be welded via at least one sensor. The data can be transformed into a point cloud data representing a three-dimensional surface of the part via a processor. A desired state indicative of a desired position of at least a portion of the welding robot with respect to the part can be identified based on the point cloud data via the processor. An estimated state indicative of an estimated position of at least the portion of the welding robot with respect to the part can be compared to the desired state via the processor. The welding instructions can be updated based on the comparison.

In some embodiments, the estimated state can be based at least in part on a model of the unwelded part. The model of the unwelded part can include annotations representing the welding instructions for the welding robot. In some embodiments, the estimated state of the part can be based at least in part on the data of the workspace.

In some embodiments, the at least one sensor can include a first sensor and a second sensor. The computer-implemented method can further comprise synchronizing the first sensor and the second sensor via the processor. In some embodiments, the first sensor can be a laser emitter and the second sensor can be a camera.

In some embodiments, a plurality of sensors can include the at least one sensor. The computer-implemented method can further compromise fusing respective data received from each sensor of the plurality of sensors to generate fused data, and determine the estimated state based on the fused data.

In some embodiments, comparing the estimated state to the desired state can comprise implementing a geometric comparator technique. In some embodiments, the computer-implemented method can further comprise updating the point cloud data based at least in part on the desired state. In some embodiments, identifying the desired state can comprise inputting the point cloud data into an artificial neural network to generate the desired state.

In some embodiments, updating the welding instructions can include adjusting a motion of the welding robot. In some embodiments, updating the welding instruction can include adjusting a motorized fixture associated with the part. In some embodiments, updating the welding instructions can include dynamically updating welding parameters in real time.

In some embodiments, the computer-implemented method can further comprise detecting a tack weld in a candidate seam on the part to be welded and updating welding parameters based at least in part on the detection of the tack weld. In some embodiments, the computer-implemented method can further comprise detecting that a gap associated with a seam on the part varies and updating welding parameters based at least in part on detection of the variable gap.

In some embodiments, updating welding instructions can comprise updating welding parameters. The updated welding parameters can include at least one of welder voltage, welder current, duration of an electrical pulse, shape of an electrical pulse, and material feed rate. In some embodiments, receiving the data of the workspace can comprise receiving the data in real time. The computer-implemented method can further comprise monitoring the desired state based at least in part on the data received in real time.

In some embodiments, identifying the desired state can further comprise implementing a particle filter on the point cloud data. In some embodiments, identifying the desired state can further comprise implementing an online classifier on the point cloud data.

In some embodiments, the computer-implemented method can further comprise implementing a particle filter and an online classifier on the point cloud data. In some embodiments, the at least one sensor can be a laser emitter. The computer-implemented method can further comprise in response to identifying at least one occluded laser line from the laser emitter, implementing a particle filter on the point cloud data to identify the desired state.

In some embodiments, a system comprising a sensor, a controller, and a welding robot is described herein. The sensor can be configured to obtain data of a workspace. The workspace can include a part to be welded. A controller can be communicably coupled to the sensor. The controller can be configured to: transform the data to a point cloud data representing a three-dimensional surface of the part, identify a desired state indicative of a desired position of at least a portion of the welding robot with respect to the part based on the point cloud data, compare an estimated state indicative of an estimated position of at least the portion of the welding robot with respect to the part to the desired state, and generate welding instructions based on the comparison. The welding robot can implement the welding instructions to weld the part.

In some embodiments, an apparatus is described herein. The apparatus can comprise a welding head including at least one laser emitter configured to generate laser lines to sweep an arc of 20 degrees to 60 degrees. The apparatus can also comprise a receiver configured to receive reflected portion of the laser lines. The apparatus can also comprise a controller to generate welding instructions based at least in part on the reflected portion of the laser lines.

DETAILED DESCRIPTION

Figure 1:
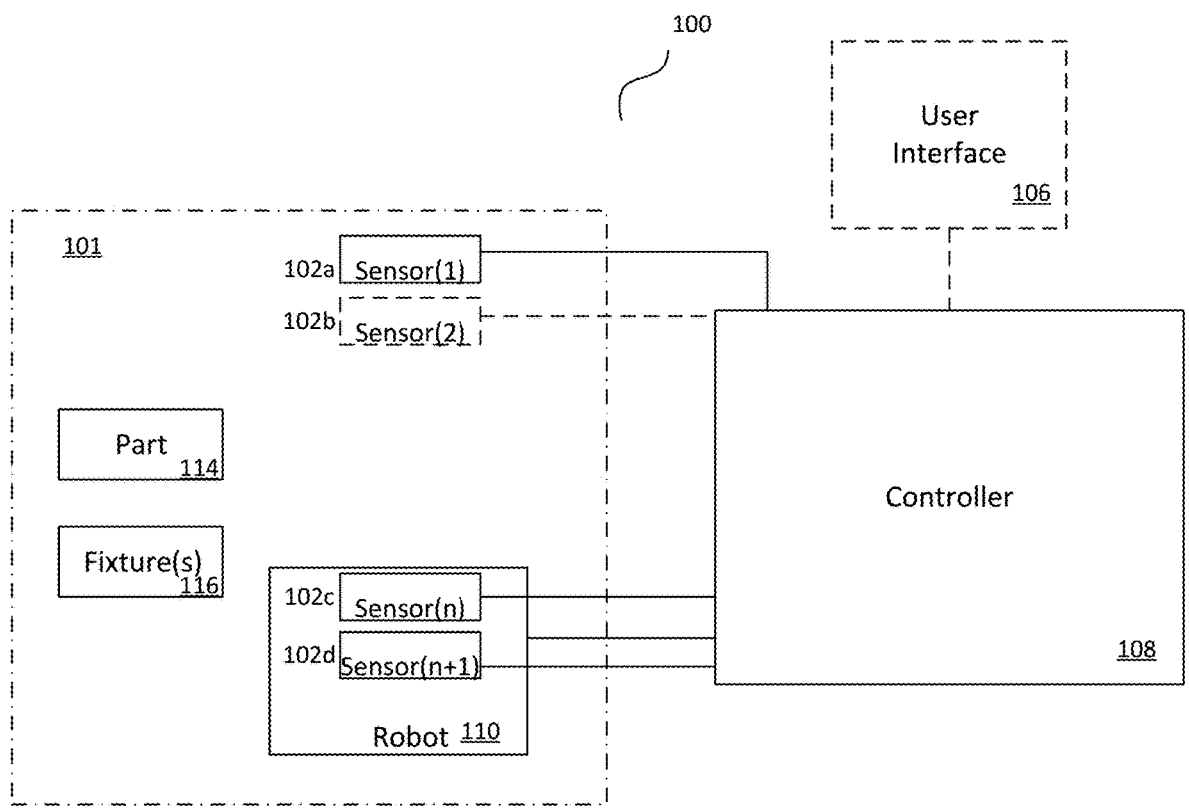
FIG. 1 is a schematic description of a system for precise welding of a part using a welding robot with real time feedback and dynamic adjustment in real time, according to an embodiment.

Non-limiting examples of various aspects and embodiments of the invention are described herein and illustrated in the accompanying drawings.

Systems and methods for providing real time feedback and dynamic adjustment for welding robots are disclosed herein. Technology described herein can update instructions provided to a welding robot to perform robotic welding in real time based on real time feedback.

Robots that can be configured to perform operations such as welding, brazing, bonding, a combination thereof, and/or the like are referred to herein as "welding robots." In contrast to manual operations, welding robots provide significant benefits by reducing production time, cutting cost of labor, improving safety, and conserving materials. "Robotic welding" refers to operations that can be performed by a welding robot, such as welding, brazing, bonding, and/or the like. "Welding robots" as used and described herein can be autonomous or semi-autonomous robots.

Conventional methods and systems for controlling welding robots have several drawbacks. Typically, a model (e.g., a kinematic model for a welding robot and/or a computer aided design (CAD) model for a part to be welded) can be used to determine an "estimated state" (described in detail below) or sequence of estimated states of the system. For instance, the estimated state could indicate a position of the welding robot (e.g., position of a weld tip of the welding robot) with respect to the part to be welded. Conventional technologies often use the estimated state as a starting point for controlling the welding robot. More specifically, robotic weld programs (e.g., software programs, algorithms, etc.) to control a welding robot are generated based on the estimated state of the system. These robotic weld programs include a weld path (e.g., trajectory for the weld tip) for the welding robot based on the initial state such that the welding robot can perform a welding operation on the part.

However, there are several challenges associated with relying solely on the model(s). For example, kinematic models may not account for things like backlash, imprecise appendage lengths, or bending of components included in the welding robot. Similarly, CAD models may not include precise dimensions of the part to be welded, for example, when an actual part deviates from a model of that part. Such discrepancies could lead to bad welds. More precisely, the determined estimated state may result in the welding robot being positioned in an inaccurate/imprecise manner relative to the part. That is, the calculated weld path may be inaccurate owing to these discrepancies. Therefore, traditional robotic weld programs can cause poor welds, misplaced welds, collisions amongst components within the system, or other detrimental phenomenon.

Furthermore, most robotic weld programs are often repeatedly implemented on different units or examples of the same part. Put differently, the same CAD model may be used to determine an estimated state for different units of the same part. Therefore, inconsistencies between different units can lead to bad welds. Similarly, unexpected part placement relative to the welding robot, misaligned parts, poor tolerances, or other similar issues can lead to bad welds.

Additionally, in some situations, a part may shift, move, or deform during a welding process. More specifically, welding processes often produce high levels of internal stresses to parts which could induce the parts to shift, deform, or otherwise move during a welding process. Such shifts can cause robotic weld programs that are based on estimated state to be imprecise and/or inaccurate thereby causing bad welds. In addition, during processes such as additive manufacturing process or cladding, multiple layers of material may need to be deposited on a part. Accordingly, multiple passes of weld may be needed in order to deposit multiple layers. The estimated state in such a case may therefore change after a single weld pass.

Thus, real time feedback during welding operations can reduce bad welds. Moreover, using real time feedback to dynamically adjust welding instructions for the welding robots can result in precise welding of parts. However, the accuracy of systems implementing feedback can vary depending on the amount of data that the systems incorporate into feedback.

Existing feedback system are often primitive providing merely fine adjustments such as fine adjustments to the welding head or adjustments to the welding robot's motion and trajectory so that the welding tip is on the seam to be welded. This does not always ensure that the weld is precise. For instance, the welding instructions are programmed in existing feedback systems based typically on two-dimensional drawing or model of the expected seam. Such two-dimensional models may be provided by a user. The welding instructions may include a weld path (e.g., motion and/or trajectory) that the welding robot is to traverse based on the geometry of the seam or gap. Feedback may be provided using a laser-scanner sensor that looks ahead of the welding tip. This can allow existing feedback systems to determine features the welding tip is about to encounter. The laser-scanner looks ahead of the welding tip and provides feedback that generally allows the weld head to follow a seam, as long as the seam geometry remains consistent and visible to the laser-scanner.

However, there are several drawbacks associated with such existing feedback systems. If the modeled geometry of the seam or the gap is not precise and does not match the actual physical geometry of the seam or the gap, then such feedback systems may not recognize or localize the gaps or seams. Similarly, some portions of the seam or gap may be occluded or may not be completely visible to the laser-scanner during the welding operations. Therefore, existing feedback systems may not recognize such occluded portions during welding operations. Furthermore, since existing feedback systems make minor adjustments to the motion of the welding robot such systems may not have the ability to adjust motion of motorized fixtures (e.g., fixtures that can be actuated to move a part relative to the welding robot).

Furthermore, in some instances, since the laser-scanner looks ahead to determine features that the welding tip might encounter, the welding robot may be constrained to always point or aim the laser-scanner ahead of the welding operation. These constraints can slow down the system, force a collision when welding a seam, and/or can render a seam to be welded unweldable.

Therefore, there is a need for sophisticated real time feedback to dynamically adjust welding operations in real time.

The technology described herein includes sensors to scan a part. In some embodiments, the technology described herein can determine an estimated state of the system, part, welding robot, fixtures, and/or the seam. The estimated state can be estimated position, estimated velocity, and/or estimated acceleration of the system, part, welding robot, fixtures, and/or seam in a universal or relative reference frame. For example, the estimated state can be an estimated position of the welding robot relative to the part. The estimated state can be determined based on sensor input and/or models such as CAD models of the part and/or kinematic models of the welding robot.

As described above, the sensors can scan the part, fixtures, portions of the welding robot, workspace, etc. The technology described herein can automatically recognize a seam to be welded on the part based on the sensor data. In some embodiments, the technology described herein can localize the seam relative to the part. The technology described herein can then determine a desired state, or sequence thereof, of the system, part, welding robot, fixtures, and/or the seam based on the recognition (and localization) of the seam. The desired state can be desired position, desired velocity, and/or desired acceleration of the system, part, welding robot, fixtures, and/or seam relative to each other. In some embodiments, the technology described herein can compare the desired state to the estimated state and can automatically update a robotic weld program based on the comparison. For instance, the robotic weld program can include a motion/trajectory (e.g., weld path) of the welding robot, welding head, other devices such as motorized fixtures, etc. in order to weld seams on the part precisely as desired without collision prior to the welding operation. An update to the robotic weld program can include dynamic real time adjustment to the motion of the welding robot, welding head, other devices such as motorized fixtures, etc. in order to weld seams on the part precisely as desired without collision during the welding operation.

As discussed above, the technology described herein can adjust motion/trajectory (e.g., weld path) for a welding robot based on data obtained from sensors. The adjustment can be made dynamically based on the comparison of the expected state with the desired state. Accordingly, in contrast to existing feedback systems, the technology described herein does not require a user to provide the shape of the seams or gaps. Additionally, even if a portion of the seam or the gap is occluded, the technology described herein can still dynamically adjust welding instructions by automatically recognizing seams and/or gaps based on the sensor data.

In contrast to existing feedback systems, the technology described herein can also operate and/or adjust the motion/trajectory of other devices such as motorized fixtures. For instance, the motorized fixtures can be actuated to move a part to be welded. Since the technology descried herein can also move the motorized fixtures, this can lead to a minimization of energy consumed by the system by limiting total motion within the system. In addition, this can improve or optimize the welding process by optimizing the position and orientation of the seam or gap relative to the welding tip and gravity. Additionally, this can also curtail collisions or possible collisions.

In contrast to existing feedback systems, the technology described herein can also adjust welding parameters in real time. This in turn can improve the quality of the weld. Some non-limiting examples of welding parameters include welder voltage, welder power or current, material feed rate (if applicable), and other parameters like duration of pulse or shape of electrical pulse, and/or the like. Some non-limiting reasons for adjusting welding parameters alone or in addition to the motion/trajectory of the welding robot and motorized fixture motion include: 1) better welding over or through welds. More specifically, tack welds along a seam usually have material properties that may be different from the material properties of the part(s). Updated welding parameters can account for the shape and geometry of the tack welds; 2) better filling of variable gap sizes by adjusting the feed rate of material and other welding parameters necessary to deposit at that level; 3) insuring good penetration of the weld over different seam geometries; 4) being able to produce the desired weld when for example collision issues interfere with the motion of the welding robot and/or other components of the system; and 5) mitigation, elimination, or alteration of porosity, inclusions, lack of fusion, undercut, overlap, insufficient throat, excessive convexity (i.e. excessive reinforcement, underfill, uneven weld legs, weld splatter, root concavity (i.e. suck-back), hot cracking, or cold cracking.

Furthermore, since the technology described herein includes a combination of model-based (e.g., determining the estimated state based on a model) and automatic recognition-based (determining a desired state based on the recognition and localization of gaps and seams from sensor data) processing, the technology can operate without a priori information about the shape of the gap or seam.

FIG. 1 is a schematic description of a system 100 for precise welding of a part 114 using a welding robot 110 with real time feedback and dynamic adjustment in real time, according to an embodiment. A workspace 101 can include a part(s) 114 to be welded. The workspace 101 can be any suitable welding area designed with appropriate safety measures for welding. For example, workspace 101 can be a welding area located in a workshop, job shop, manufacturing plant, fabrication shop, and/or the like. The part(s) 114 can be held, positioned, and/or manipulated in the workspace 101 using fixtures and/or clamps (collectively referred to as "fixtures" 116 herein). The fixtures 116 can be configured to securely hold the part 114. The fixtures 116 can induce forces necessary to limit the movement (e.g., translation and/or rotation) of parts 114 relative to other components of the system 100. For instance, fixtures 116 can be mechanical, electromechanical (e.g., another robotic system), magnetic, or any other means that can fix and/or restrict the movement of the parts 114 relative to other components of the system 100. In some embodiments, the fixtures can be adjustable. In some embodiments, the fixtures 116 can be motorized. Put differently, the fixtures 116 can be actuated to move part(s) 114 during welding process. Therefore, the fixtures 116 can be actuated in such a manner that the position and/or orientation of part(s) 114 relative to other components of the system 100 can be changed. In some embodiments, the fixtures 116 may be located fully within the workspace 101. Alternatively, the fixtures 116 may be located partially within the workspace 101. In another alternative embodiment, the workspace 101 may not include the fixtures 116.

The welding robot 110 can perform welding operations on the part 114. In some embodiments, the welding robot 110 can be a six-axis robot with a welding arm. The welding robot 110 can be any suitable robotic welding equipment such as Yaskawa® robotic arms, ABB® IRB robots, Kuka® robots, and/or the like. The welding robot 110 can be configured to perform arc welding, resistance welding, spot welding, TIG welding, MAG welding, laser welding, plasma welding, a combination thereof, and/or the like. The welding robot 110 can be responsible for moving, rotating, translating, feeding, and/or positioning welding head, sensor(s) 102, part(s) 114, and/or a combination thereof.

Figure 2:
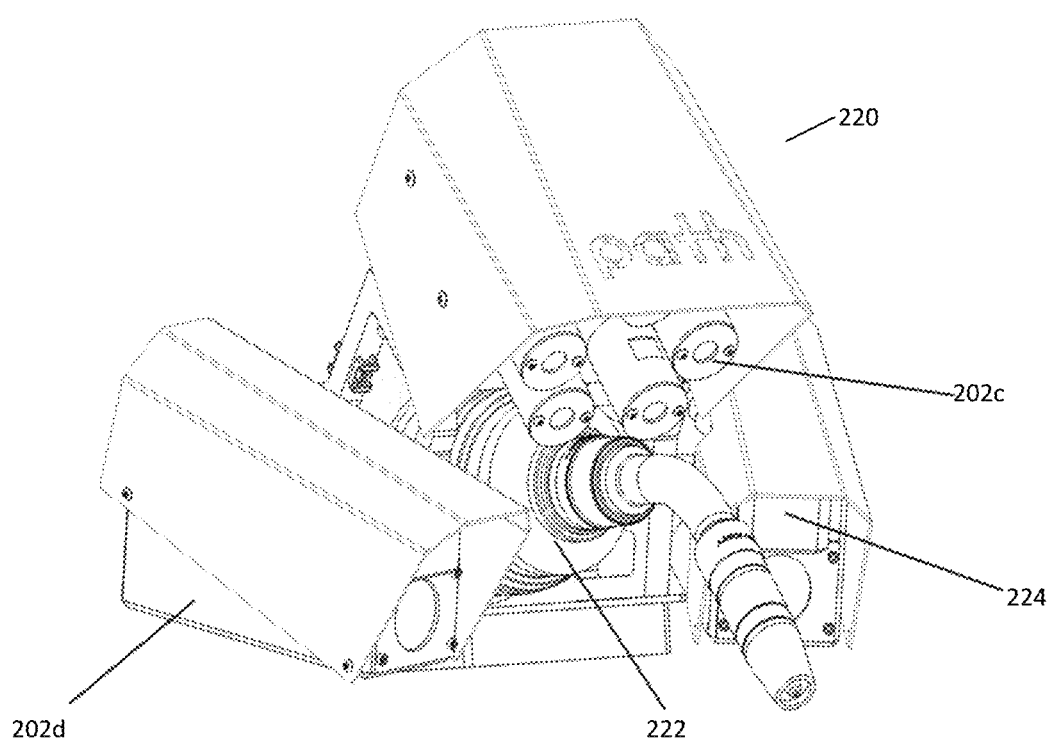
FIG. 2 illustrates an example welding head, according to some embodiments.

In some embodiments, a welding head can be mounted on, coupled to, or otherwise attached to the welding robot 110. FIG. 2 illustrates an example welding head 220, according to some embodiments. In some embodiments, the welding head 220 can be a mechanical structure and/or an enclosure that can hold, confine, align, point, or direct at least some of the electrical, optical, or sensor(s) of the welding robot 110. In some embodiments, the welding head 220 can be mounted on, coupled to, or otherwise attached to the welding robot 110 in such a manner that the at least some of the sensor(s) can observe the area or region around the location of the welds during the welding process. In some embodiments, the welding head 220 can include a processor to process sensor information obtained from the sensor(s) included within the welding head 220.

In some embodiments, the welding head 220 can include laser emitters 202c. In some embodiments, the laser emitter 202c can include polarizing filters. Laser emitters can be laser line(s), laser pattern emitter(s) and/or any other suitable sensing device that is included in, mounted on, or attached to the welding head 220. At least some part of the laser line(s) or pattern(s) can be emitted out of the welding head 220. In some embodiments, laser emitters 202c can be configured to generate laser lines or patterns that sweep and arc of 20 degrees to 60 degrees. Similarly stated, in some embodiments, laser emitters 202c can project line(s) and/or pattern(s) in front of, to the sides of, and/or at least partially behind the welding head 220. In some embodiments, the laser emitters 202c can be motorized to generate laser lines or patterns that sweep across an area of the part 112. This could enable the laser emitters 202c to scan a large area of the part. For instance, the laser emitter 202c itself could be configured to rotate to sweep the area. Additionally or alternatively, a mirror positioned in front of the lasers can be motorized to perform the sweeping motion. For example, the mirrors can have one or two degrees of freedom.

In some embodiments, the welding head 220 can optionally include laser controller(s) that can be operable to control power delivery to the laser emitters 202c. The laser controller(s) can be configured to turn the lasers on and off. The laser controller(s) can be configured to transmit feedback associated with laser emitters to one or more electronic devices coupled to laser emitter(s) 202c. In some embodiments, a receiver can be configured to receive reflected portions of the laser lines or patterns emitted from the laser emitters 202c. In some embodiments, the laser controller(s) can be configured to additionally function as the receiver.

One or more optical sensor(s) 202d can be included in the welding head 220. Some non-limiting examples of optical sensor(s) 202d include cameras, lenses, lens filters, any suitable optical device, and/or any suitable opto-electronic device. In some embodiments, filters can be used for filtering out specific wavelengths of light observable to the optical sensor(s) 202d. In some embodiments, filters can protect the optical sensor(s) 202d from different light emission during the welding process. In some embodiments, filters can enhance the laser emission from the laser emitter(s) 202c, for example light polarizing filters can be used. In some embodiments, the welding head 220 can include at least two optical sensor(s) 202d mounted on, attached to, or otherwise coupled to the welding head 220. The optical sensor(s) 202d can observe the welding head 220, the welding process, and the laser light emitted from laser emitter(s) 202c.

In some embodiments, the welding head 220 can include thermal cameras and/or thermal sensors that sense temperature. In some embodiments, ambient lights and associated controllers can be used to connect to light sources that may be disposed and/or otherwise positioned within the welding head 220 to illuminate the workspace 101.

The welding head 220 can include air blades 224 and can be used to protect portions of the welding head 220 from particulates and/or emissions from the welding process. For example, an exit air port can be positioned near the optical sensor(s) 202d and/or the laser emitter(s) 202c so as to protect the optical components. Additionally or alternatively, one or more magnets can be positioned within the welding head 220 to pull particulates and/or emissions from the welding process away from the optical components of the optical sensor(s) 202d and/or the laser emitter(s) 202c.

In some embodiments, the welding head 220 can include one or more fiducials, such as reflective markers, LED light emitters, stickers with identifiable patterns, etc. Such fiducials can be used to track the position and/or the orientation of the welding head 220 by one or more global sensor(s) (e.g., sensor 102a and 102b in FIG. 1). By tracking the position and/or the orientation of the welding head 220, a desired position and/or orientation of the welding head 220 can be determined.

In some embodiments, the welding head 220 can include force feedback sensors to detect force and/or torque applied to the welding head 220. In some embodiments, ultrasonic sensors can be coupled to, mounted on, or otherwise attached to the welding head 220. Ultrasonic sensors can help avoid collision. Additionally, ultrasonic sensors can sense surfaces of objects around the welding head 220 and can therefore be used to determine a desired state of the welding head 220. In some embodiments, inertial measurement unit(s) (e.g., accelerometers and/or gyroscope(s)) can provide an estimate of acceleration and/or orientation of at least a portion of the welding robot 110. The welding head 220 can include a welding torch 222 to perform the welding operation.

Figure 3:
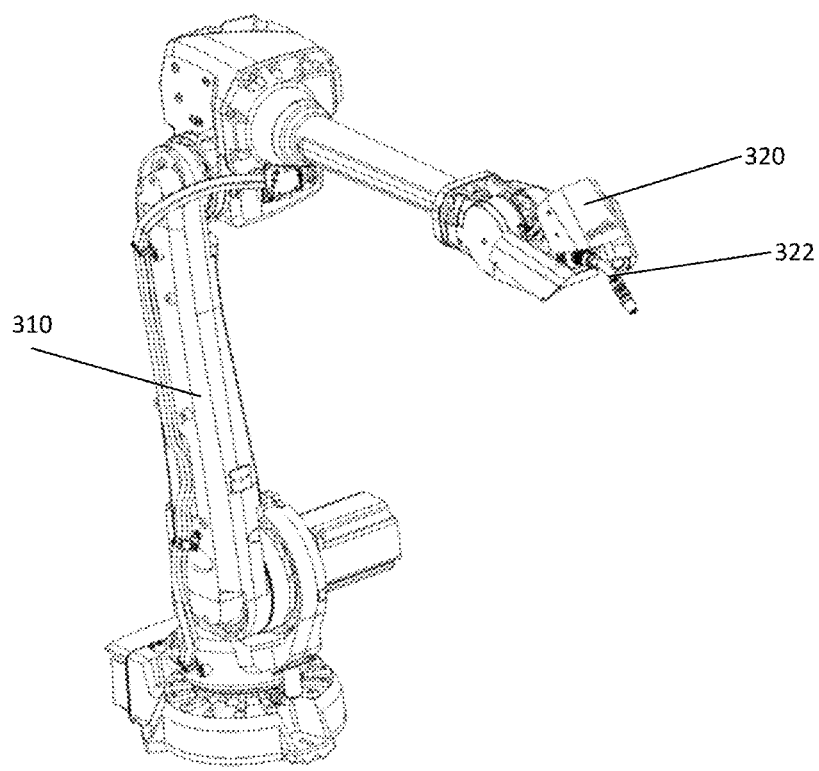
FIG. 3 shows an illustration of a welding head attached to a welding robot, according to some embodiments.

FIG. 3 shows an illustration of a welding head 320 (e.g., structurally and/or functionally similar to welding head 220 in FIG. 2) attached to a welding robot 310 (e.g., structurally and/or functionally similar to welding robot 110 in FIG. 1) by means of clamping to a welding torch 322 at the end of the welding robot 310.

Referring back to FIG. 1, sensors 102a, 102b, 102c, 102d, . . . (collectively referred to as sensor(s) 102) can capture data associated with the workspace 101. In some embodiments, one or more sensor(s) 102 can be a mounted to the robot 110 or otherwise can be integral to the workspace 101. For example, the one or more sensor(s) (e.g., sensors 102c and 102d in FIG. 1) can be attached to or otherwise can be a part of the of the welding robot 110. More specifically, the sensor(s) (e.g., sensors 102c and 102d in FIG. 1) can be a part of, attached to, or mounted on a welding head (as described in FIG. 2) of the welding robot 110. In some embodiments, sensors 102c and 102d can be laser emitters, optical sensors (e.g., cameras), or a combination thereof.

In some embodiments, one or more global sensor(s) (e.g., sensor 102a and 102b in FIG. 1) can be mounted on another robot (not shown in FIG. 1) positioned within the workspace 101. For example, a robot may be operable to move (e.g., rotational and/or translational motion) such that the sensor(s) 102a and 102b can capture image data of the workspace 101 from various angles. In some embodiments, one or more sensor(s) 102a and 102b can be portable device such as a handheld computer tablet, a smartphone with camera, or a digital camera. Additionally or alternatively, one or more sensor(s) 102a and 102b can be laser emitters.

In some embodiments, the sensor(s) 102 described herein can be configured to observe and collect data of all regions including the region around the welding tip. For example, multiple laser lines (e.g., from multiple laser emitters) and/or optical sensors can effectively surround the welding tip, such as forming a closed polygon.

Sensor(s) 102 can determine information associated with the desired state of the part 114, fixtures 116, welding robot 110, and/or the seam. As discussed above, desired state can include the desired position and/or desired orientation of the part 114, fixtures 116, welding robot 110, and/or the seam in the physical space relative to each other. Additionally or alternatively, desired state can include desired velocity, acceleration, forces, and/or torques associated with the part 114, fixtures 116, welding robot 110, and/or the seam. Sensor data can include multiple sets of state such that each state in the set of states can correspond to a state at a different point in time.

The sensor(s) 102 can be operable to capture 2D and/or 3D images/data of the part 114, fixture 116, portion of the robot 110, and/or workspace 101. In some instances, the sensors 102 can be operable to image and/or monitor a weld laid by the robot 110, before, during, and/or after weld deposition. In some embodiments, the sensor(s) 102 can generate a point cloud representation of the workspace 101.

FIG. 1 illustrates two sensors 102c and 102d within the robot 110 and two global sensors 102a and 102b solely for illustrative purposes. It should be readily understood that any suitable number of sensors can be included in the robot 110. Similarly, any suitable number of sensors can be positioned in the workspace 101 as global sensors.

The sensor(s) 102 can be communicatively coupled to the controller 108. The sensor(s) 102 and/or the controller 108 can be operable to process data from the sensor(s) 102 to assemble two-dimensional data and three-dimensional data from multiple sensors 102 to generate point cloud data. The controller 108 can include one or more processors (e.g., CPU). The processor(s) can be any suitable processing device configured to run and/or execute a set of instructions or code, and can include one or more data processors, image processors, graphics processing units, digital signal processors, and/or central processing units. The processor(s) can be, for example, a general purpose processor, a Field Programmable Gate Array (FPGA), an Application Specific Integrated Circuit (ASIC), and/or the like. The processor(s) can be configured to run and/or execute application processes and/or other modules, processes and/or functions associated with the system 100.

In some embodiments, the controller 108 can synchronize the sensor(s) 102. For instance, the controller 108 can synchronize optical sensor(s) and laser emitter(s) such that when the sensor(s) capture images of the part(s) 112 and/or workspace 101, each captured image includes only a single laser pattern such as a line. Put differently, multiple laser lines originating from different laser emitters can be challenging for optical sensors to distinguish. Accordingly, the controller 108 can be configured to strobe or alternate laser lines such that only a single line is present at any given time. Similarly, the controller 108 can synchronize optical sensor(s), welding head, and laser emitter(s) such that the laser emitter(s) are turned on and an image of the laser response captured when the welding head is not operating in pulse mode (e.g., mode in which an electric arc or electric current that induces the substrate, filler material, or both to melt occurs in pulses through time). Such synchronization can produce images with less light pollution induced by the welding process, for example, by capturing images in between periods in which the welder is active (e.g., between arc pulses).

In some embodiments, the controller 108 can process the data obtained from the sensor(s) 102. For example, the controller can identify and generate laser lines and/or patterns emitted by laser emitter(s) such as disclosed in U.S. Pat. No. 10,551,179, the entire disclosure of which is hereby incorporated by reference. The laser lines and/or patterns as captured by optical sensors can vary in the presence other components of the system 100, shadows, different light sources, light emitted from welding processes, etc.

In some embodiments, the controller can generate three-dimensional point cloud data. Point cloud data can represent three-dimensional surface of parts 112, fixtures 116, and other components of system 100 that are visible to the welding head of the welding robot 110. Point cloud data can be generated, for example, using laser and/or light triangulation techniques, as Structure-From-Motion, and/or Stereo Based approaches. The three-dimensional data may be collected using laser finding techniques.

In some embodiments, one or more images (e.g., image data captured by the sensor(s) 102 at a particular orientation relative to part 114) may be overlapped together to reconstruct and generate three-dimensional image data of the workspace 101. The three-dimensional image data can be collated in a manner such that the point cloud generated from the data can have six degrees of freedom. For instance, each point on the point cloud may represent an infinitesimally small position in three-dimensional space. The sensor(s) 102 can capture multiple images of the point from various angles. These multiple images can be collated to determine an average image pixel for that point. The averaged image pixel can be attached to the point. For example, if the sensor(s) 102 are color cameras having red, green, and blue channels, then the six degrees of freedom can be {x-position, y-position, z-position, red-intensity, green-intensity, and blue-intensity}. If the sensor(s) 102 are black and white cameras with black and white channels, then four degrees of freedom may be generated.

The controller 108 can be configured to perform seam recognition based on the point cloud data. In some embodiments, the controller 108 can localize, classify, and/or measure seams, separating volumes, and/or welds. In some embodiments, the controller 108 can implement a neural network to recognize and/or classify a seam to be welded. For instance, the neural network can be configured to implement pixel-wise and/or point-wise classification on the point cloud data in order to recognize and classify a seam to be welded. In this manner, the controller 108 can generate recognized seam data that encodes the position of seams, separating volumes, and/or welds. The controller 108 can determine a desired state of the part 112, fixture 116, welding robot 110, and/or seam based on the seam recognition and classification.

In some embodiments, the controller can determine an estimated state of the part 112, fixture 116, welding robot 110, and/or seam based on one or more a priori models (e.g., kinematic models of welding robot 110, CAD models of part 112, etc.). For example, CAD models of the part 112 can include annotations representing one or more seams on the part to be welded. Based on the geometry and/or shape of the part 112 and seams, the controller 108 can determine an estimated state. The controller 108 can then compare the estimated state to the desired state. For instance, the controller 108 can implement geometric comparator techniques to compare the estimated state to the desired state. The controller 108 can then correct for inaccuracies in data from sensor(s) 102 or state estimations (e.g., desired state and estimated state estimations), to correct for bending, movement, or deformation of part(s) 112 relative to the system 100 that may be induced by the welding process. In this manner, the controller 108 can provide dynamic adjustments to welding instructions.

Geometric comparator techniques takes into account geometric data (e.g., expected, modeled, and/or predicted data) of the from part(s) 112, seam(s), etc., measured state information of the part(s) 112, robot 110, fixture(s) 116, etc., and also three-dimensional point cloud data and uses this data. Geometric comparator techniques can use this data to generate a more accurate estimate of state(s) (e.g., desired state) of the part(s) 112, seam(s) 116, robot 110, weld(s), etc. Some non-limiting examples of geometric comparator techniques generally can include determining an estimated state from the models, determining a desired state from the three-dimensional point cloud, and measuring and quantizing the difference between the desired state and the estimated state.

In some embodiments, an accurate estimate of the desired state can be determined by implementing, Kalman filters, particle filters, a combination thereof, and/or the like. For instance, particle filters at some given time-step, can include several particles representative of possible or feasible states. The possible or feasible states can be associated with simulated point cloud data, stimulated image data, or combination thereof for each of the particles. The estimated state can then be determined by comparing the stimulated point cloud data and/or the stimulated image data (collectively referred as "simulated data") with the actual point cloud data and/or actual image data (collectively referred as "actual data"). This helps determine the most probable particle (state) that the system is currently in.

In some embodiments, the controller 108 can implement a neural network such as Convolutional Neural Network (CNN), Artificial neural network (ANN) to estimate a desired state. In some embodiments, the neural network can take image data, point cloud data, or a combination thereof, and output an encoding of the input. For instance, the encoding can be into a smaller dimensional latent space. In some embodiments, the output from a particle of the particle filter (e.g., most probable particle that the system is currently in) can be provided as an input to the neural network. For example, a stimulated point cloud data and/or image data may be provided as an input to the neural network. The output of this input (i.e., the encoding of this input) can be compared to the output from the neural network of actual point cloud data and/or actual image data. For instance, the output of the stimulated data can be compared with the output of the actual data by performing a dot product of the two. Additionally or alternatively, the neural network can input output from one of the particle of the particle filter as well as the actual data at the same time. The neural network can then generate a score that represents the similarity between the two data. Additionally or alternatively, any suitable method may be used to compare the simulated data to the actual data.

In some embodiments, different CNNs can be used to process image data from optical cameras, thermal cameras, and/or other sensors. Alternatively, the controller can be configured to fuse image data from various sources. For example, the controller 108 can fuse data from various sensor(s) 102 such as optical sensor(s), laser emitter(s), and other sensor(s). By fusing the data from various sources, the controller 108 can provide accurate feedback to the welding robot 110 in order to perform precise welding. For instance, by receiving data of the welding operation from two or more sensors can provide a wide-angle view of the part and the weld tip during the welding process. In contrast, when a single sensor such as a laser emitter is used to provide data, it is possible that some portion of the seam that is being welded may be occluded from the laser emitter. Such occlusion can lead to large deviations from the desired state. With complete view of the part during the welding process, the controller can accurately identify the desired state and make updates to it in real time. In some embodiments, in order to fuse data from various sources, in the CNN where branches of networks converge are combined. The CNN(s) can be trained, for example, using cost or error functions, parameter optimization or parameter adjustment, gradient descent methods, and/or any other suitable technique.

In some embodiments, the controller 108 can implement a Neural Network in order to analyze the weld state (e.g., state of the part(s) 112, fixture(s) 116, welding robot 110, and/or seam during the welding process). For instance, as discussed above a neural network can be implemented to compare simulated data with the actual data. Additionally or alternatively, a neural network can be implemented to classify seams or gaps to be welded. In some embodiments, a neural network can be implemented to classify tack welds or other welds that exist on the seam. The neural network can be structurally and/or functionally similar to a Artificial Neural Network (ANN), Recurrent Neural Network (RNN) and/or Convolutional Neural Network (CNN) or any other suitable neural network. For example, ANN elements that perform different classification, regression, or generative tasks, may feed into other ANNs or other intermediate processing methods or filters. The ANN can be configured to derive, generate, and/or originate weld state information based on data originally produced by the welding head, sensor(s) 102, or combination thereof. The ANN can be trained, for example, using cost or error functions, parameter optimization or parameter adjustment, gradient descent methods, and/or any other suitable techniques.

In some embodiments, the welding robot 110, part(s) 112, fixtures 116, and/or other components of the system 100 can be controlled by a robotic welding program executed on the controller 108. The robotic weld program can be configured to transmit welding instructions to the welding robot 110, part(s) 112, fixtures 116, and/or other components of the system 100 so as to weld seams or separating volumes. In some embodiments, the robotic weld program can be generated prior to the commencement of the welding process or execution of the robotic weld program itself. The robotic weld program can be dynamically altered, interrupted, deleted, modified, or added to by the controller 108 based on comparison of the desired state and estimated state. For instance, the robotic weld program can be updated, created, altered, deleted, amended, or otherwise changed specific to the motion/trajectory of the welding robot 110 and/or other motorized components (e.g., motorized fixture(s) 116) within the system 100. Additionally or alternatively, the robotic weld program can be updated, created, altered, deleted, amended, or otherwise changed specific to the welding process (e.g., angle of the weld tip relative to the part, velocity of weld tip, acceleration of weld tip, etc.). As discussed above, the controller 108 can update, create, alter, delete, amend, or otherwise change the robotic weld program based on the comparison of the estimated state to the desired state. For instance, the weld tip may be moved from an estimated position to a more accurate desired position.

Some non-limiting techniques implemented by the controller 108 to update the robotic weld program include a) implementing a linear time invariant controller employing control theory methods, tuning, and modeling, that uses error based on modeled and observed state information for the robot 110, fixture(s) 116, part(s) 114, seam, weld, etc.; b) implementing a non-linear classical controller that can be build, for example, on either Gain Scheduling, Feedback Linearization, or Lyapunov, and/or any other suitable methods that uses error based on modeled and observed state information for the robot 110, fixture(s) 116, part(s) 114, seam, weld, etc.; c) implementing optimal motion controller(s), which can include any applicable optimal controllers, that uses error based on modeled and observed state information for the robot 110, fixture(s) 116, part(s) 114, seam, weld, etc.; d) implementing artificial neural network controllers which can be built and trained neural networks that are constituted based on mathematical elements most typically associated with ANNs and can use error based on modeled and observed state information for the robot 110, fixture(s) 116, part(s) 114, seam, weld, etc.

In some embodiments, the controller 108 can be configured to recognize and measure root gap, hole, void, and weld and update robotic weld program based on recognition in order to produce more precise welds. The two-dimensional images and the three-dimensional point cloud data from the sensor(s) 102 can be used to recognize the root gap, hole, void, or weld and further can be used to adapt and/or update the robotic weld program to account for the root gap, hole, void, or weld. In some embodiments, in a first mode, the controller 108 can first recognize the root gap, hole, void, or weld and can then subsequently update the robotic weld program. Alternatively, in a second mode, the controller 108 can recognize the root gap, hole, void, or weld and can update the robotic weld program simultaneously.

In the first mode, the controller 108 can break down the task of recognition, classification, and measurement of root gaps, holes, voids, welds, or any obstruction along the seams separately. This can provide an indication on how to adapt and/or update the robotic weld program. In this mode, a user can see and understand the decisions that the controller 108 makes.

Recognition and measurements of root gaps, holes, voids along the seam can be accomplished in part or in whole via trained neural networks. The input data to these neural networks can be point cloud data and/or two-dimensional image data. The data flows into a one or more networks which then classifies regions or boundaries of holes, voids, or root gap. In some embodiments, the neural network can determine the size of the holes, voids, or root gap. The input to this neural network may include a model of the part(s) 112 or regions on the part(s) 112. For example, the input to the neural network can be a CAD model of a part(s) 112 that has had its surface sampled and turned into point cloud. In some embodiments, these neural networks can be any suitable neural network such as Dynamic Graph CNN, point-net, etc. The input data can be presented to the neural network in any suitable form (e.g., as unordered list of vectors). The input data can be pre-processed (e.g., using normalization).

In some embodiments, the input data can be provided to the neural network at once. Alternatively, the input data can be provided to the neural network incrementally. The neural networks can be trained in any suitable manner. In some variations, the neural networks can include long short-term memory (LSTM) modules, or other similar modules meant to deal with time-varying or sequential data. The output could be in any suitable form. For example, the output could include classification of gap associated for each original three-dimensional points and/or also a subset of the three-dimensional points and/or can be associated with pixels of the two-dimensional images. The neural networks can be trained to output other information simultaneously, for example surface roughness measurements, and are not necessarily limited to just handle the recognition and measurement tasks alone.

Adaptation and/or updating the robotic weld program can also occur in part via trained neural network(s). This neural network, or set of neural networks, can take in the resultant classification output described above, information about what the desired weld is, and where it should be. This neural network(s) can then output at least information about orientation and/or location of the weld tip relative to the seam. The network may also be trained such that weld parameters, for example voltage, current, arc-length, wire/wire material, substrate material and thickness, and orientation of the seam relative to gravity can be either inputs, outputs, or some combination of both. For example, a user may want to constrain the voltage, current, and arc-length, (inputs the network) but not the orientation of the seam relative to gravity (output). Alterations or adaption of weld parameters like current, voltage, or arc-length can be useful for changing the shape of the welds or handling transition between substrates like welds that have been previously deposited. The neural network may be trained to take in a range, envelope, or bounds of parameters. For example, there could be two inputs for voltage that bound the allowable range. The network may be trained to output over a range, envelope, or bounds of parameters. For example, the network could have n number of outputs discretized over an associated range of some parameter or parameters. The network may be trained to indicate in some manner if the desired weld output is feasible or not. In some embodiments, the network may also output alternative similar welds that are feasible, for example instead of fillet weld of some radius it could output a larger weld in order to cover some larger gap.

The neural network can also be trained to also output an indication of the resultant weld quality, weld shape, weld penetration, measure of porosity, or a combination thereof. In some embodiments, the neural network can be any suitable neural network such as Dynamic Graph CNN, point-net, etc. The input data can be presented to the neural network in any suitable form (e.g., unordered list of vectors). The input data can be pre-processed (e.g., using normalization).

In some embodiments, the input data can be provided to the neural network at once. Alternatively, the input data can be provided to the neural network incrementally. The neural networks can be trained in any suitable manner. In some variations, the neural networks can include LSTM modules or other similar modules meant to deal with time-varying or sequential data. The output could be in any suitable form. The neural network can be trained to output other information simultaneously, for example, the probability of a successful weld.

In the second mode, the recognition and adaption can occur in one shot. In contrast to the first mode, there is no intermediary recognition or classification step in the second mode. The inputs to the neural network in this mode can include a model of the part(s) 112 or regions on the part(s) 112. For example, the input to the neural network can be a CAD model of a part(s) 112 that has had its surface sampled and represented as point cloud. The input to the neural network can further include information about what the desired weld is and where it should be. The output includes at least information about orientation and/or location of the weld tip relative to the part.

In some embodiments, the neural network can also be trained such that weld parameters, for example voltage, current, arc-length, wire/wire material, substrate material and thickness, and orientation of the seam relative to gravity can be either inputs, outputs, or some combination of both. For example, the user may want to constrain the voltage, current, and arc-length, (inputs the network) but not the orientation of the seam relative to gravity (output). Alterations or adaption of weld parameters like current, voltage, or arc-length can be useful for changing the shape of the welds or handling transition between substrates like welds that have been previously deposited. The neural network may be trained to take in a range, envelope, or bounds of parameters. For example, there could be two inputs for voltage that bound the allowable range. The network may be trained to output over a range, envelope, or bounds of parameters. For example, the network could have n number of outputs discretized over an associated range of some parameter or parameters. The network may be trained to indicate in some manner if the desired weld output is feasible or not; it may also output alternative similar welds that are feasible, for example instead of fillet weld of some radius it could output a larger weld in order to cover some larger gap. The network may be trained to also output an indication of the resultant weld quality, weld shape, weld penetration, measure of porosity, or a combination thereof. In some embodiments, the neural network can be any suitable neural network such as Dynamic Graph CNN, point-net, etc. The input data can be presented to the neural network in any suitable form (e.g., unordered list of vectors). The input data can be pre-processed (e.g., using normalization).

In some embodiments, the input data can be provided to the neural network at once. Alternatively, the input data can be provided to the neural network incrementally. The neural networks can be trained in any suitable manner. In some variations, the neural networks can include LSTM modules or other similar modules meant to deal with time-varying or sequential data. The output could be in any suitable form. The neural network can be trained to output other information simultaneously, for example, the probability of a successful weld.

In some embodiments, Simultaneous Localization and Mapping can be used to fill in holes, gaps, or surface regions in the parts or seams (e.g., if these were not initially scanned completely). In some embodiments, Simultaneous Localization and Mapping can be used to continue to localize in the case that CAD models are incomplete, and/or if a scan of a part or seam misses a portion of the part and/or includes ambiguous or unreliable data.

In some embodiments, the controller 108 can continuously update models (e.g., kinematic models and/or CAD models) for example, by adding point cloud data to these models. In some embodiments, the point cloud data can include information associated with the addition of a weld that has been deposited or created. Such data can, for example, be collected via the laser emitter(s) illuminating a portion of the part behind the weld tip of the robot 110 as it travels. "Behind" here can refer to the direction substantially opposite to the travel direction of the weld tip and/or a portion of the part recently passed by the weld tip.

The controller 108 can also add weld state data to models, for example, adding information about weld state based on point(s) or region(s) of the surface as observed using three-dimensional point cloud data. In this way, weld state data can be assigned such that information includes not only the three-dimensional geometry (from the three-dimensional point cloud), but also to some extent information about the weld (e.g., based on CNN/ANN derived weld models). In some embodiments, the CAD model can be continuously updated and can include notions of time or some notion of sequence. Additionally or alternatively, CAD model can be updated based on scanned data of the part(s) 112 during, between, or after the welding process.

Although system 100 can operate with little or no user interaction, in some embodiments, system 100 can optionally include a user interface 106 that can allow users to provide weld parameters and/or update weld parameters. The user interface 106 can enable a user to interact with the system 100. Some non-limiting examples of the user interface 106 include menu-driven interface, graphical user interface (GUI), touchscreen GUI, a combination thereof, and/or the like.

Figure 4:
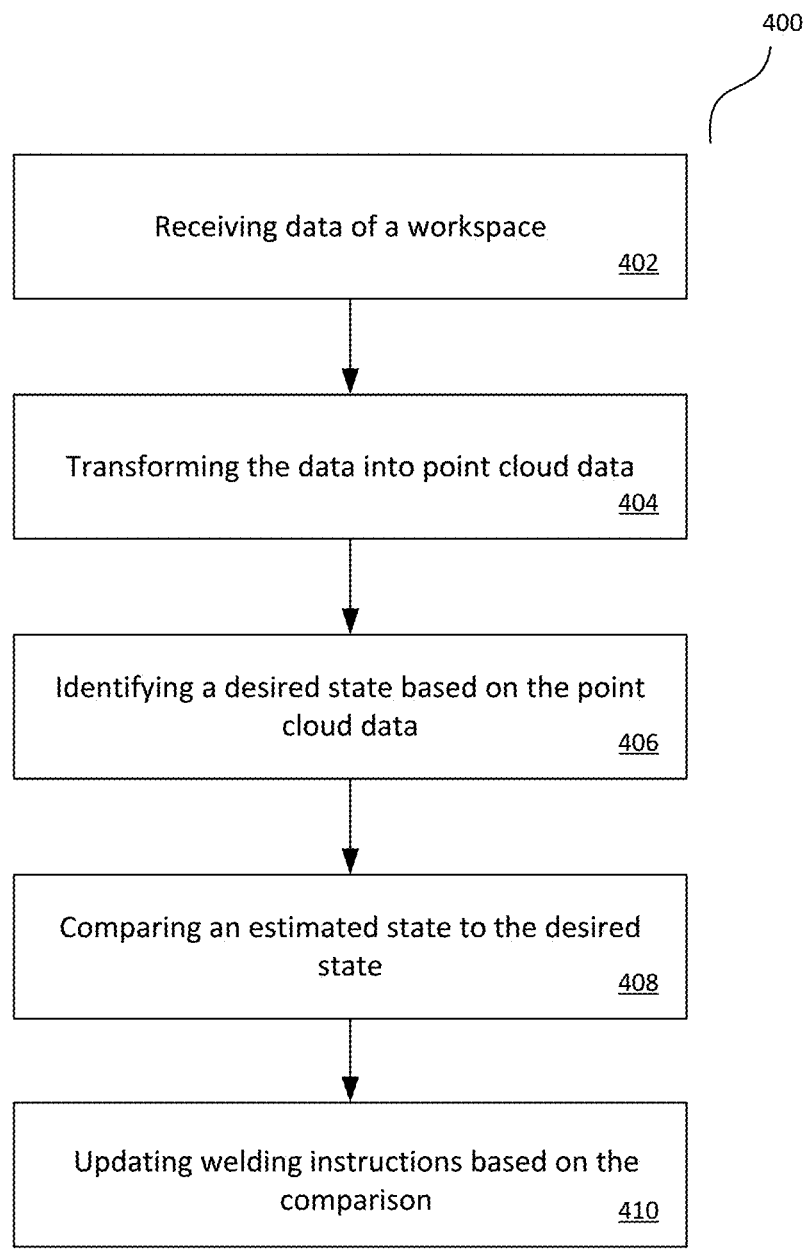
FIG. 4 is a flow diagram of a method for precise welding with real time feedback and dynamic adjustment in real time, according to an embodiment.

FIG. 4 is a flow diagram of a method 400 for precise welding with real time feedback and dynamic adjustment in real time, according to an embodiment. At 402, the method includes receiving data of a workspace (e.g., workspace 101 in FIG. 1) including a part (e.g., part(s) 112 in FIG. 1) to be welded. The data can be sensor data from sensors (e.g., sensor(s) 102 in FIG. 1) such as laser emitter(s), optical sensor(s), and/or a combination thereof. In some embodiments, these sensor(s) can be synchronized before initializing the method 400. In some embodiments, data from different sensor(s) can be fused together and then analyzed.

At 404, the method includes transforming the data from the sensor into point cloud data. For example, the data from the sensors can be two-dimensional data. This data can be transformed into a three-dimensional point cloud data representing the three-dimensional surface of the part.

At 406, the method includes determining desired state based on the point cloud data. The desired state can be indicative of a desired position of at least a portion of the welding robot (e.g., welding robot 110 in FIG. 1) relative to the part. For instance, the desired state can be indicative of the desired portion of a weld tip included in the welding robot relative to the part. In some embodiments, an artificial neural network can be implemented on the point cloud data to determine the desired state. In some embodiments, the desired state can be determined by recognizing a seam to be welded on the part. In some embodiments, the desired state can be determined by localizing the seam relative to the part.

In some embodiments, the desired state can be determined by implementing an online classifier on the point cloud data. However, it may be challenging to determine the desired state of portions of a part that may be occluded from the view of a laser emitter(s) using the online classifier. In some embodiments, in response to determining such occlusions, the desired state can be determined by implementing a particle filter. In some embodiments, the desired state can be determined by implementing a combination of online classifier and a particle filter.

At 408, the method includes comparing an estimated state to the desired state. The estimated state may be indicative of an estimated position of at least a portion of the welding robot (e.g., weld tip) relative to the part. The estimated state may be determined based on models such as kinematic models and/or CAD models. A geometric comparator technique may be implemented to compare the estimated state to the desired state.

At 410, the method includes updating welding instructions based on the comparison. The welding instructions can be included in a robotic weld program and updating the welding instructions can include updating the robotic weld program. In some embodiments, updating the welding instructions can include updating a motion of the robot (e.g., moving the robot from a previous position to a new position to reach the desired state). In some embodiments, updating the welding instructions can include updating a motion of motorized fixtures (e.g., fixture(s) 116 in FIG. 1). In some embodiments, updating the welding instruction can including updating weld parameters in real time. The welding instructions can also be updated based on a detection of a tack weld and/or detection of a variable gap on the seam to be welded.

It should be readily understood that method 400 can be continuously repeated in any suitable manner. For example, prior to welding operations, welding instructions included in the robotic weld program can include a motion/trajectory (e.g., weld path) for the welding robot and/or the motorized fixtures based on an initial estimated state or an initial desired state. During the welding process, the sensors can provide data of the workspace (e.g., part being welded, seam being welded, weld tip, etc.). Based on this data, an updated desired state can be determined. This process can be continued until the welding process comes to an end. Put differently, the weld path can be continuously monitored and updated through the welding process.

While various embodiments have been described above, it should be understood that they have been presented by way of example only, and not limitation. For example, some embodiments described herein reference a single light source, a single detector, and/or a single pattern. It should be understood, however, that multiple light sources can illuminate a part. Each light source can illuminate the part with a similar pattern, or different patterns. Patterns can be detected by multiple detectors. In embodiments with multiple light sources, it may be advantageous for each light source to illuminate the part with a different pattern such that detector(s) and/or compute devices processing images captured by detectors can identify which light source projected which pattern.

Furthermore, although various embodiments have been described as having particular features and/or combinations of components, other embodiments are possible having a combination of any features and/or components from any of embodiments where appropriate as well as additional features and/or components. For example, although not described in detail above, in some embodiments, methods of determining a shape of a portion of a part may include a calibration phase during which distortion of the detector(s), the lens(es) on said detector(s), the distortion in the combination of detector(s) and lens(es), and/or the relative position of the camera(s) to a test surface or fixture onto which a pattern(s) is projected are determined.

Some embodiments described herein relate to methods and/or processing events. It should be understood that such methods and/or processing events can be computer-implemented. That is, where method or other events are described herein, it should be understood that they may be performed by a compute device having a processor and a memory. Methods described herein can be performed locally, for example, at a compute device physically co-located with a robot or local computer/controller associated with the robot.

Memory of a compute device is also referred to as a non-transitory computer-readable medium, which can include instructions or computer code for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. One or more processors can be communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Where methods described above indicate certain events occurring in certain order, the ordering of certain events may be modified. Additionally, certain of the events may be performed concurrently in a parallel process when possible, as well as performed sequentially as described above. Although various embodiments have been described as having particular features and/or combinations of components, other embodiments are possible having a combination of any features and/or components from any of the embodiments where appropriate.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and embodiments are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

What is claimed is:

1. A computer-implemented method for updating welding instructions for a welding robot, the computer-implemented method comprising:
   receiving, via at least one sensor, data of a workspace that includes a part to be welded;
   transforming, via a processor, the data into a point cloud data representing a three-dimensional surface of the part;
   identifying, via the processor and based on the point cloud data, a desired state indicative of a desired position of at least a portion of the welding robot with respect to the part; and
   comparing, via the processor, an estimated state indicative of an estimated position of at least the portion of the welding robot with respect to the part to the desired state, the estimated state based on a model of the unwelded part that includes annotations representing the welding instructions for the welding robot; and
   updating, via the processor, the welding instructions based on the comparison.

2. The computer-implemented method of claim 1, wherein the estimated state is further based on the data of the workspace.

3. The computer-implemented method of claim 1, wherein the at least one sensor includes a first sensor and a second sensor, the computer-implemented method further comprising:
   synchronizing, via the processor, the first sensor and the second sensor.

4. The computer-implemented method of claim 1, wherein the first sensor is a laser emitter and the second sensor is a camera.

5. The computer-implemented method of claim 1, wherein the at least one sensor is from a plurality of sensors, the computer-implemented method further comprising:
   fusing respective data received from each sensor of the plurality of sensors to generate fused data; and
   determining the estimated state based on the fused data.

6. The computer-implemented method of claim 1, wherein comparing the estimated state to the desired state comprises implementing a geometric comparator technique.

7. The computer-implemented method of claim 1, further comprising:
   updating the point cloud data based at least in part on the desired state.

8. The computer-implemented method of claim 1, wherein identifying the desired state comprises inputting the point cloud data into an artificial neural network to generate the desired state.

9. The computer-implemented method of claim 1, wherein updating the welding instructions includes adjusting a motion of the welding robot.

10. The computer-implemented method of claim 1, wherein updating the welding instructions comprises adjusting a motorized fixture associated with the part.

11. The computer-implemented method of claim 1, wherein updating the welding instructions comprises dynamically updating welding parameters in real time.

12. The computer-implemented method of claim 1, further comprising:
    detecting a tack weld in a candidate seam on the part to be welded; and
    updating welding parameters based at least in part on the detection of the tack weld.

13. The computer-implemented method of claim 1, further comprising:
    detecting that a gap associated with a seam on the part varies; and
    updating welding parameters based at least in part on detection of the variable gap.

14. The computer-implemented method of claim 1, wherein updating welding instructions comprises updating welding parameters, and wherein the updated welding parameters include at least one of welder voltage, welder current, duration of an electrical pulse, shape of an electrical pulse, and material feed rate.

15. The computer-implemented method of claim 1, wherein receiving the data of the workspace comprises receiving the data in real time.

16. The computer-implemented method of claim 15, further comprising monitoring the desired state based at least in part on the data received in real time.

17. The computer-implemented method of claim 1, wherein identifying the desired state further comprises implementing a particle filter on the point cloud data.

18. The computer-implemented method of claim 1, wherein identifying the desired state further comprises implementing an online classifier on the point cloud data.

19. The computer-implemented method of claim 1, further comprising:
    implementing a particle filter and an online classifier on the point cloud data.

20. A computer-implemented method, comprising:
    receiving, via a laser emitter, data of a workspace that includes a part to be welded;
    transforming, via a processor, the data into a point cloud data representing a three-dimensional surface of the part;
    identifying at least one occluded laser line from the laser emitter;
    implementing a particle filter on the point cloud data in response to identifying the at least one occluded laser line to identify a desired state indicative of a desired position of at least a portion of the welding robot with respect to the part;
    comparing, via the processor, an estimated state indicative of an estimated position of at least the portion of the welding robot with respect to the part to the desired state; and
    updating, via the processor, the welding instructions based on the comparison.

21. A system, comprising:
- a sensor configured to obtain data of a workspace, the workspace including a part to be welded;
- a controller communicably coupled to the sensor, the controller configured to:
  - transform the data to a point cloud data representing a three-dimensional surface of the part,
  - identify a desired state indicative of a desired position of at least a portion of a welding robot with respect to the part based on the point cloud data,
  - compare an estimated state indicative of an estimated position of at least the portion of the welding robot with respect to the part to the desired state, the estimated state is based on a model of the unwelded part that includes annotations representing the welding instructions for the welding robot; and
  - generate welding instructions based on the comparison; and
- the welding robot to implement the welding instructions to weld the part.

* * * * *